(12) United States Patent
Zhang et al.

(10) Patent No.: US 9,518,867 B2
(45) Date of Patent: Dec. 13, 2016

(54) DETECTING DEVICE AND METHOD COMBINING IMAGES WITH SPECTRUMS IN ULTRA-WIDE WAVEBAND

(71) Applicant: HUAZHONG UNIVERSITY OF SCIENCE AND TECHNOLOGY, Wuhan, Hubei (CN)

(72) Inventors: Tianxu Zhang, Hubei (CN); Hong Zhang, Hubei (CN); Jindong Fei, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/902,271

(22) PCT Filed: Feb. 10, 2015

(86) PCT No.: PCT/CN2015/072679
§ 371 (c)(1),
(2) Date: Dec. 30, 2015

(87) PCT Pub. No.: WO2016/106957
PCT Pub. Date: Jul. 7, 2016

(65) Prior Publication Data
US 2016/0202122 A1   Jul. 14, 2016

(30) Foreign Application Priority Data
Dec. 30, 2014   (CN) .......................... 2014 1 0851351

(51) Int. Cl.
*G01N 21/00*   (2006.01)
*G01J 3/28*   (2006.01)
(Continued)

(52) U.S. Cl.
CPC ............ *G01J 3/2823* (2013.01); *G01B 11/002* (2013.01); *G01J 3/021* (2013.01); *G01J 3/0208* (2013.01)

(58) Field of Classification Search
CPC ............... G01N 21/00; G01J 3/28; G01J 3/36; G01J 3/02; G01J 3/2823; G01J 3/0208; G02B 27/00; G01B 11/00
See application file for complete search history.

(56) References Cited

U.S. PATENT DOCUMENTS
6,781,127 B1   8/2004 Wolff et al.
2002/0173723 A1   11/2002 Lewis et al.

FOREIGN PATENT DOCUMENTS
CN   101866054         10/2010
CN   101866054 A  *  10/2010   ................ G01J 3/28
(Continued)

OTHER PUBLICATIONS

International search report for international application No. PCT/CN2015/072679, dated Sep. 11, 2015 (6 pages, Including English translation).
(Continued)

*Primary Examiner* — Tarifur Chowdhury
*Assistant Examiner* — Jamil Ahmed
(74) *Attorney, Agent, or Firm* — Hamre, Schumann, Mueller & Larson, P.C.

(57) ABSTRACT

The invention discloses a detecting device combining images with spectra in an ultra-wide waveband, comprising a scanning rotating mirror, a Cassegrain mirror assembly, three spectroscopes, a reflector, four broadband lens assemblies, a visible and near-infrared lens assembly, a long wave lens assembly, a CCD imaging unit, an FPA imaging unit, a Fourier spectrum measuring unit and a grating spectrum measuring unit. The invention is able to recognize a target
(Continued)

accurately by spectrum measurement under the guidance of a preliminary recognition process by imaging in visible, near-infrared and long wave infrared wavebands and can solve the problems of incomplete waveband imaging, restricted optical layout, large device size, and poor ability to detect moving objects and dynamic behaviors in prior art. The invention features small size, high integration and being convenient and flexible to use, and can realize image and spectrum detection of moving objects and dynamic behaviors in an ultra-wide waveband and switch a tracking and recognition process for different targets automatically and therefore can be widely used in national economy and national security.

10 Claims, 4 Drawing Sheets

(51) Int. Cl.
    *G01B 11/00*    (2006.01)
    *G01J 3/02*    (2006.01)

(56) References Cited

FOREIGN PATENT DOCUMENTS

| CN | 102564589 | | 7/2012 | |
| CN | 103776540 | | 5/2014 | |
| CN | 103776540 A | * | 5/2014 | ............. G01J 3/453 |
| CN | 204439211 | | 7/2015 | |

OTHER PUBLICATIONS

X. Liu et al., "An Infrared Scanning and Tracking System for Detecting Mid-Wave Infrared Spectral Characteristics of Moving Targets," Applied Spectroscopy, vol. 68, No. 11 (2014), p. 1289-1295.

Y. Zhang et al., "Design and Fabrication of Visible +1.54um Laser/Longwave Infrared Dichroic Beamsplitter," J. Infrared Millim. Waves, vol. 28, No. 4 (2009), p. 307-310, including English abstract.

\* cited by examiner

DETECTING DEVICE AND METHOD COMBINING IMAGES WITH SPECTRUMS IN ULTRA-WIDE WAVEBAND

FIELD OF THE INVENTION

The invention relates to an interactive discipline of remote sensing and image recognition, and more particularly to a detecting device and a detecting method combining images with spectra in an ultra-wide waveband, applicable for target detecting, tracking and recognition.

BACKGROUND OF THE INVENTION

Characteristics of an object can be expressed by a spectrum thereof, which includes a scattering spectrum from the environment and a radiation spectrum from its own body. Different objects and materials can be recognized by the spectra which can improve the ability of remote sensing when combined with 2D images thereof.

Devices collecting both images and spectra are usually multispectral and hyperspectral scanners. For example, airborne and satellite-borne multispectral and hyperspectral scanners developed abroad which are installed on air vehicles can cover a comparative wide range of ground by scanning mirrors rotating to have instantaneous visual fields move in directions perpendicular to flying directions. However, for original data obtained by the devices need to be transmitted back to the ground for processing and a processing rate thereof is slow, the devices are only applicable for unreal-time detection of static scenes instead of moving subjects and dynamic behaviors.

SUMMARY OF THE INVENTION

In view of the above-mentioned problems, it is an objective of the invention to provide a detecting device and a detecting method combining images with spectra in an ultra-wide waveband, so as to solve technical problems of failing to realize spectrum measurement in a full waveband covering visible, near-infrared, short wave infrared, medium wave infrared, and long wave infrared wavebands and realize measurement combining visible and near-infrared waveband with long wave infrared waveband images in prior art.

To achieve the above objective, according to one embodiment of the present invention, there is provided a detecting device combining images with spectra in an ultra-wide waveband, comprising a scanning rotating mirror, a Cassegrain minor assembly, a first spectroscope, a reflector, a first broadband lens assembly, a second broadband lens assembly, a third broadband lens assembly, a fourth broadband lens assembly, a second spectroscope, a third spectroscope, a visible and near-infrared lens assembly, a long wave lens assembly, a charge-coupled device (CCD) imaging unit, a focal plane array (FPA) imaging unit, a Fourier spectrum measuring unit and a grating spectrum measuring unit, wherein the scanning rotating mirror is controlled by a servo motor to aim at a target area and operable for reflecting light from the target area to the Cassegrain mirror assembly, the Cassegrain mirror assembly is operable for collecting the reflected light and reflecting it to the first spectroscope, the first spectroscope is operable for transmitting infrared light of 2~14 um to the first broadband lens assembly and reflecting infrared light of 0.4~2 um to the reflector, the second spectroscope is operable for transmitting a portion of light of a first predetermined waveband to the long wave lens assembly and reflecting the residual portion of light of the first predetermined waveband and light of the residual waveband to the second broadband lens assembly simultaneously, and the long wave lens assembly is operable for focusing light transmitted by the second spectroscope to the FPA imaging unit for imaging;

the second broadband lens assembly is operable for focusing light reflected by the second spectroscope to the Fourier spectrum measuring unit for spectrum acquisition;

the reflector is operable for reflecting light of 0.4~2 um reflected by the first spectroscope to the third broadband lens assembly, the third spectroscope is operable for transmitting a portion of light of a second predetermined waveband to the visible and near-infrared lens assembly and reflecting the residual portion of light of the second predetermined waveband and light of the residual waveband to the fourth broadband lens assembly simultaneously, and the visible and near-infrared lens assembly is operable for focusing light transmitted by the third spectroscope to the CCD imaging unit for imaging; and the fourth broadband lens assembly is operable for focusing light reflected by the third spectroscope to the grating spectrum measuring unit for spectrum acquisition.

In a class of this embodiment, the first predetermined waveband is long wave infrared waveband and the second predetermined waveband is visible and near-infrared waveband.

In a class of this embodiment, the scanning rotating mirror comprises a plane reflector, a 2D turntable and a servo motor, the plane reflector is fixed on the 2D turntable by a groove therein, two drive shafts of the servo motor are mechanically connected to a pitch axis and a rotation axis of the 2D turntable respectively, and the plane reflector can pitch or rotate with the 2D turntable driven by the servo motor.

In a class of this embodiment, the plane reflector is gilded K9 glass with a comparatively high reflectivity for visible, near-infrared, short wave infrared, medium wave infrared and long wave infrared light.

In a class of this embodiment, the Cassegrain mirror assembly uses a Cassegrain system and is formed by a parabolic reflector and a hyperboloid reflector, so as to realize imaging in visible, near-infrared and long wave infrared wavebands and energy gathering of a target.

In a class of this embodiment, an occlusion ratio between the parabolic reflector and the hyperboloid reflector is no greater than 3:1.

In a class of this embodiment, the first spectroscope, the second spectroscope and the third spectroscope are plated with a two-layered antireflection film respectively, the first spectroscope reflects visible and near-infrared light totally and transmits short wave, medium wave and long wave infrared light totally, the second spectroscope transmits 50% of long wave infrared light to the long wave lens assembly to realize compensation and calibration of long wave infrared imaging and reflects the residual light to the second broadband lens assembly, and the third spectroscope transmits 50% of visible and near-infrared light to the visible and near-infrared lens assembly to realize compensation and calibration of visible and near-infrared imaging and reflects the residual light to the fourth broadband lens assembly.

In a class of this embodiment, the first broadband lens assembly and the second broadband lens assembly are operable for compensation and calibration of a converged spot of short wave, medium wave and long wave infrared light, the second broadband lens assembly can be coupled with a short wave, medium wave and long wave infrared fiber for output, the third broadband lens assembly and the fourth broadband lens assembly are operable for compensation and calibration of a converged spot of visible and near-infrared light, and the fourth broadband lens assembly can be coupled with a visible and near-infrared fiber for output.

In a class of this embodiment, the first broadband lens assembly, the second broadband lens assembly, the third broadband lens assembly and the fourth broadband lens assembly are produced by athermalisation so that locations of imaging surfaces thereof can keep stable at an ambient temperature of −40° C.~+60° C. without a focusing component.

The invention combines images and spectra as a multispectral scanner and an imaging spectrometer and can realize detection, tracking, spectrum measurement and recognition of multiple moving objects and dynamic behaviors automatically.

The invention uses an optical path for both imaging and spectrum measurement in infrared waveband and another optical path for both imaging and spectrum measurement in visible and near-infrared waveband, realizes detection of moving objects and dynamic behaviors combining images and spectra in an ultra-wide waveband, and features rapid response and high recognition efficiency.

The invention recognizes an interested object by a detecting device combining images and spectra in visible, near-infrared, and long wave infrared wavebands and obtains images and spectra of moving objects and dynamic behaviors in an ultra-wide waveband, so as to realize detection of the moving objects and the dynamic behaviors combining the images and the spectra in the ultra-wide waveband.

The invention features small size, high integration and being convenient and flexible to use, and therefore can be widely used in national economy and national security.

According to another embodiment of the present invention, there is provided a detecting method based on the detecting device combining images with spectra in an ultra-wide waveband illustrated above, comprising steps of:

(1) capturing and tracking moving objects and dynamic behaviors by a long wave infrared imaging unit thereby obtaining a long wave infrared image sequence thereof, and capturing and tracking the moving objects and the dynamic behaviors by a visible and near-infrared imaging unit simultaneously thereby obtaining a visible and near-infrared image sequence thereof;

(2) capturing target feature points ($x_1$, $y_1$) of long wave infrared imaging and target feature points ($x_2$, $y_2$) of visible and near-infrared imaging respectively by an object detecting module and outputting coordinates of the target feature points ($x_1$, $y_1$) and coordinates of the target feature points ($x_2$, $y_2$);

(3) outputting target feature points (x, y) of the moving objects and the dynamic behaviors by combining the target feature points ($x_1$, $y_1$) with the target feature points ($x_2$, $y_2$);

(4) moving optical axis of the long wave infrared imaging unit and that of the visible and near-infrared imaging unit respectively to each of the target feature points (x, y) by the scanning rotating mirror;

(5) obtaining ultra-wide waveband infrared spectra by the Fourier spectrum measuring unit and obtaining visible and near-infrared spectra by the grating spectrum measuring unit;

(6) combining images and spectra in visible, near-infrared and long wave infrared wavebands respectively and obtaining images and spectra of the moving objects and the dynamic behaviors in an ultra-wide waveband;

(7) outputting identification of the moving objects and the dynamic behaviors by a recognition module; and (8) storing the images and the spectra of the moving objects and the dynamic behaviors in the ultra-wide waveband in a target fingerprint database and outputting detection results in real time by a screen.

The detecting method of the invention has an excellent performance in remote detection and recognition by distinguishing different objects or materials according to spectral characteristics combined with 2D spatial images thereof.

The detecting method of the invention captures and tracks a target more accurately and stably by combining feature points of long wave infrared imaging with feature points of visible and near-infrared imaging and the target can be a moving object (such as a plane or an automobile) or a dynamic behavior (such as fire, volcano eruption or explosion) shown in FIG. 5.

BRIEF DESCRIPTION OF THE ACCOMPANYING DRAWINGS

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
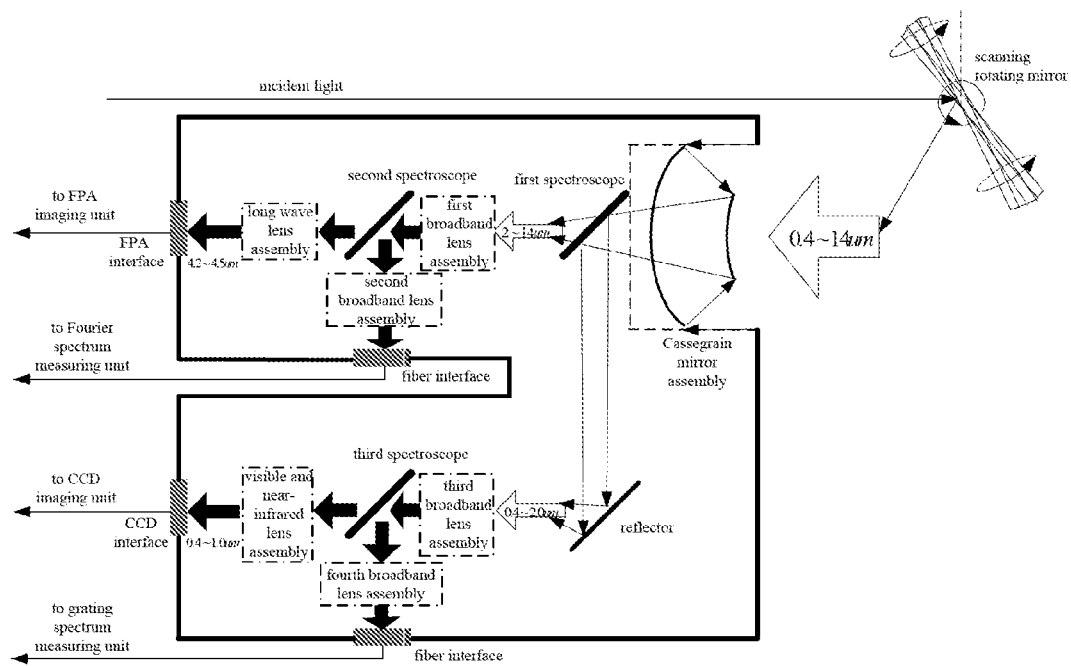
FIG. 1 is a schematic diagram of a detecting device combining images with spectra in an ultra-wide waveband of the invention.
Figure 2:
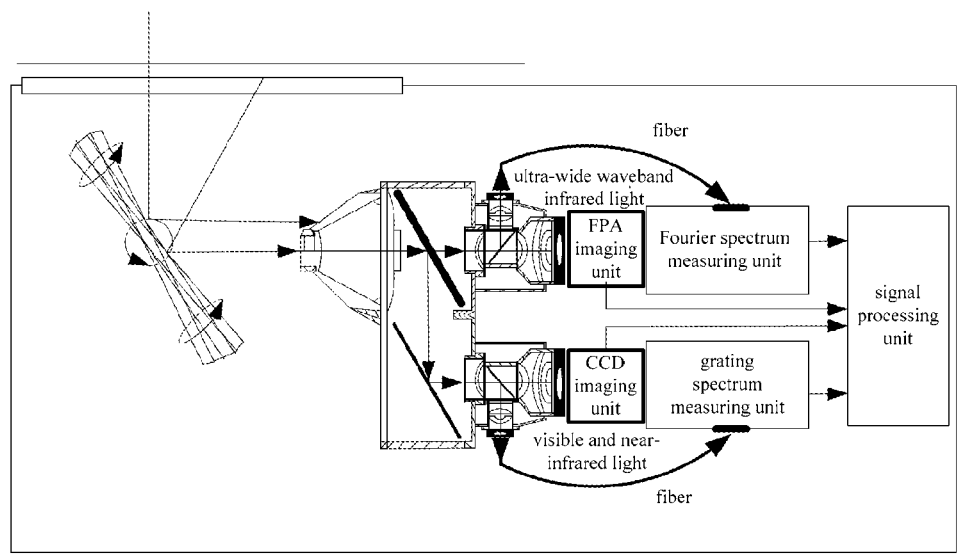
FIG. 2 is an infrastructure of a detection device combining images with spectra in an ultra-wide waveband of an exemplary embodiment of the invention.

As shown in FIG. 1 and FIG. 2, a detecting device combining images with spectra in an ultra-wide waveband integrating functions of imaging and spectrum measurement is provided. The detecting device comprises a scanning rotating mirror, a Cassegrain mirror assembly, a first spectroscope, a reflector, a first broadband lens assembly, a second broadband lens assembly, a third broadband lens assembly, a fourth broadband lens assembly, a second spectroscope, a third spectroscope, a visible and near-infrared lens assembly, a long wave lens assembly, a CCD imaging unit, an FPA imaging unit, a Fourier spectrum measuring unit and a grating spectrum measuring unit. The scanning rotating mirror is controlled by a servo motor to aim at a target area and operable for reflecting light from the target area to the Cassegrain mirror assembly, the Cassegrain mirror assembly is operable for collecting the reflected light and reflecting it to the first spectroscope, the first spectroscope is operable for transmitting infrared light of 2~14 um to the first broadband lens assembly and reflecting infrared light of 0.4~2 um to the reflector, the second spectroscope is operable for transmitting a portion of light of a first predetermined waveband to the long wave lens assembly and reflecting the residual portion of light of the first predetermined waveband and light of the residual waveband to the second broadband lens assembly simultaneously, the long wave lens assembly is operable for focusing light transmitted by the second spectroscope to the FPA imaging unit for imaging, and the second broadband lens assembly is operable for focusing light reflected by the second spectroscope to the Fourier spectrum measuring unit for spectrum acquisition. The reflector is operable for reflecting light of 0.4~2 um reflected by the first spectroscope to the third broadband lens assembly, the third spectroscope is operable for transmitting a portion of light of a second predetermined waveband to the visible and near-infrared lens assembly and reflecting the residual portion of light of the second predetermined waveband and light of the residual waveband to the fourth broadband lens assembly simultaneously, the visible and near-infrared lens assembly is operable for focusing light transmitted by the third spectroscope to the CCD imaging unit for imaging, and the fourth broadband lens assembly is operable for focusing light reflected by the third spectroscope to the grating spectrum measuring unit for spectrum acquisition.

The detecting device further comprises a signal processing unit operable for combining and processing signals from the CCD imaging unit, the FPA imaging unit, the Fourier spectrum measuring unit and the grating spectrum measuring unit.

The scanning rotating mirror further comprises a plane reflector, a 2D turntable and a servo motor, the plane reflector is fixed on the 2D turntable by a groove therein, two drive shafts of the servo motor are mechanically connected to a pitch axis and a rotation axis of the 2D turntable respectively, the plane reflector can be gilded K9 glass with a comparatively high reflectivity for visible, near-infrared, short wave infrared, medium wave infrared and long wave infrared light, and the plane reflector can pitch or rotate with the 2D turntable driven by the servo motor so as to improve flexibility of detection and realize local and sparse sampling.

Specifically, the Cassegrain mirror assembly uses a Cassegrain system and is formed by a parabolic reflector and a hyperboloid reflector, so as to realize spectrum imaging in visible, near-infrared and long wave infrared wavebands and energy gathering of a target, and an occlusion ratio between the parabolic reflector and the hyperboloid reflector is no greater than 3:1. A comparatively small occlusion ratio is in favor of increasing transmissivity of the optical system under the condition of a reasonable distance between the primary mirror and the secondary mirror for imaging.

Furthermore, the first spectroscope, the second spectroscope and the third spectroscope are plated with a two-layered antireflection coating respectively, the first spectroscope reflects visible and near-infrared light totally and transmits short wave, medium wave and long wave infrared light totally, the second spectroscope transmits 50% of long wave infrared light to the long wave lens assembly to realize compensation and calibration of long wave infrared imaging and reflects the residual light to the second broadband lens assembly, and the third spectroscope transmits 50% of visible and near-infrared light to the visible and near-infrared lens assembly to realize compensation and calibration of visible and near-infrared imaging and reflects the residual light to the fourth broadband lens assembly.

Furthermore, the first broadband lens assembly and the second broadband lens assembly are operable for compensation and calibration of a converged spot of short wave, medium wave and long wave infrared light, the second broadband lens assembly can be coupled with a short wave, medium wave and long wave infrared fiber for output, the third broadband lens assembly and the fourth broadband lens assembly are operable for compensation and calibration of a converged spot of visible and near-infrared light, and the fourth broadband lens assembly can be coupled with a visible and near-infrared fiber for output.

Furthermore, the first broadband lens assembly, the second broadband lens assembly, the third broadband lens assembly and the fourth broadband lens assembly are produced by athermalisation so that locations of imaging surfaces thereof can keep stable at an ambient temperature of −40° C.~+60° C. without a focusing component.

The following measures are adopted in structure design:
  (1) lightweight duralumin is used to reduce weight;
  (2) a Pro-E engineering structural design software is used for modeling considering structural stiffness and stress deformation and estimating weight and mass center location including optical elements; and
  (3) a thin-filmed light-shielding hood is configured to diminish interference from the background and the sunlight.

Figure 4:
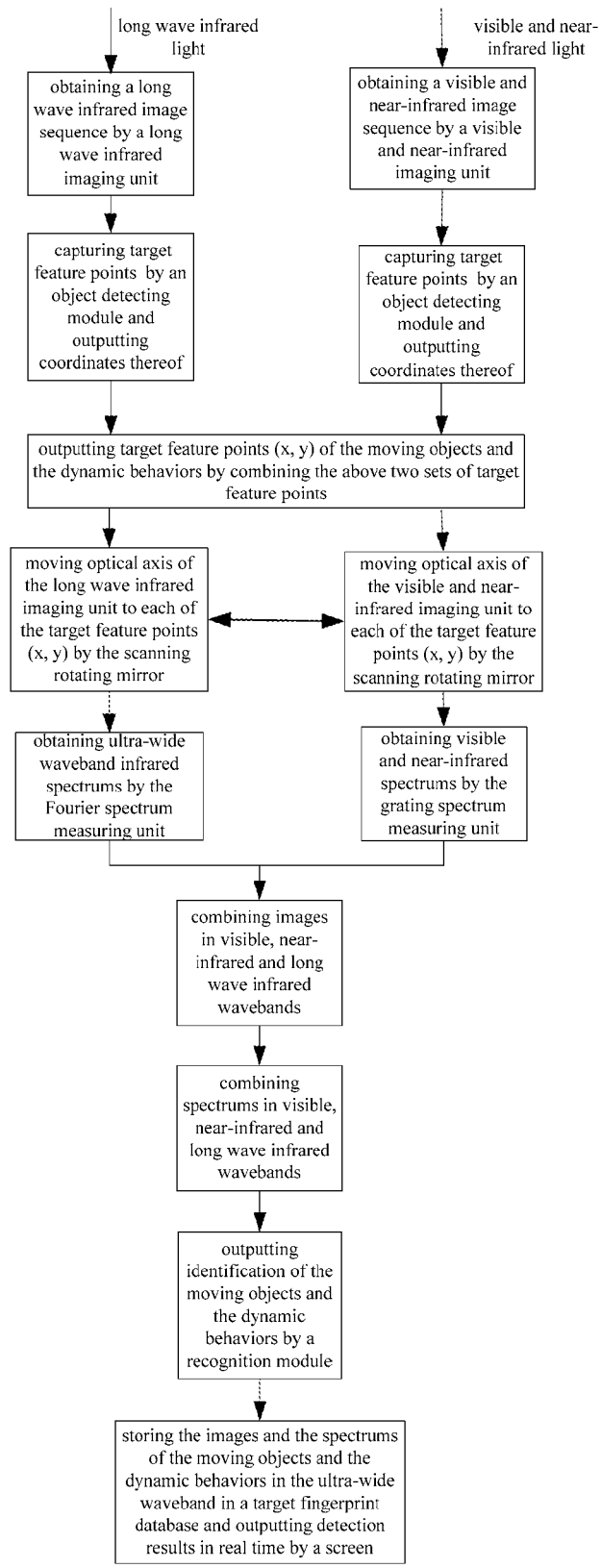
FIG. 4 is a flow chart of a detecting method combining images with spectra in an ultra-wide waveband of the invention.

Furthermore, as shown in FIG. 4, a detecting method based on the detecting device combining images with spectra in an ultra-wide waveband illustrated above is provided, comprising steps of:
  (1) capturing and tracking moving objects and dynamic behaviors by a long wave infrared imaging unit thereby obtaining a long wave infrared image sequence thereof, and capturing and tracking the moving objects and the dynamic behaviors by a visible and near-infrared imaging unit simultaneously thereby obtaining a visible and near-infrared image sequence thereof;
  (2) capturing target feature points $(x_1, y_1)$ of long wave infrared imaging and target feature points $(x_2, y_2)$ of visible and near-infrared imaging respectively by an object detecting module and outputting coordinates of the target feature points $(x_1, y_1)$ and coordinates of the target feature points $(x_2, y_2)$;
  (3) outputting target feature points (x, y) of the moving objects and the dynamic behaviors by combining the target feature points $(x_1, y_1)$ with the target feature points $(x_2, y_2)$;
  (4) moving optical axis of the long wave infrared imaging unit and that of the visible and near-infrared imaging unit respectively to each of the target feature points (x, y) by the scanning rotating mirror;
  (5) obtaining ultra-wide waveband infrared spectra by the Fourier spectrum measuring unit and obtaining visible and near-infrared spectra by the grating spectrum measuring unit;
  (6) combining images and spectra in visible, near-infrared and long wave infrared wavebands respectively and obtaining images and spectra of the moving objects and the dynamic behaviors in an ultra-wide waveband;
  (7) outputting identification of the moving objects and the dynamic behaviors by a recognition module; and
  (8) storing the images and the spectra of the moving objects and the dynamic behaviors in the ultra-wide waveband in a target fingerprint database and outputting detection results in real time by a screen.

Figure 5:
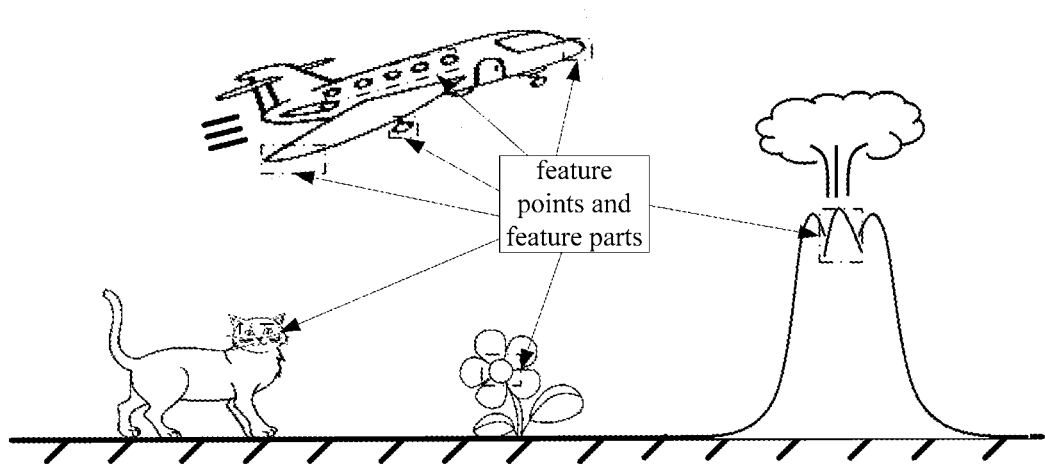
FIG. 5 illustrates feature points and feature parts in exemplary embodiments of the invention.

As shown in FIG. 5, feature points and feature parts being able to be detected by the invention include head, tail, cockpit, tires and engine of an aircraft, eyes of an animal, flowers of a plant, volcano eruption, etc.

The detecting device of the invention is further illustrated by a detecting system combining images with spectra in an ultra-wide waveband in FIG. 2.

Specifically, the Cassegrain mirror assembly is formed by a parabolic reflector and a hyperboloid reflector, vision centers of the two are overlapped and all of the elements are deposed in a hermetic shell. Incident light (covering visible, near-infrared and long wave infrared wavebands) from a target is reflected to the Cassegrain mirror assembly by the scanning rotating mirror, and is further reflected by the Cassegrain mirror assembly to the first spectroscope. The first spectroscope is plated with a two-layered antireflection film to reflect visible and near-infrared light totally and transmit long wave infrared light totally, long wave infrared light of the incident light is transmitted by the first spectroscope and focused by the first broadband lens assembly to the second spectroscope, 50% of the long wave infrared light is transmitted by the second spectroscope and focused by the long wave lens assembly to the FPA imaging unit for imaging, the residual portion of the long wave infrared light is reflected by the second spectroscope to the second broadband lens assembly and transmitted to the Fourier spectrum measuring unit for spectrum acquisition via a coupled fiber, visible and near-infrared light of the incident light is reflected by the first spectroscope and the reflector sequentially and then focused by the third broadband lens assembly to the third spectroscope, 50% of the visible and near-infrared light is transmitted by the third spectroscope and focused by the visible and near-infrared lens assembly to the CCD imaging unit for imaging, and the residual portion of the visible and near-infrared light is reflected by the third spectroscope to the fourth broadband lens assembly and transmitted to the grating, spectrum measuring unit for spectrum acquisition via a coupled fiber.

Figure 3:
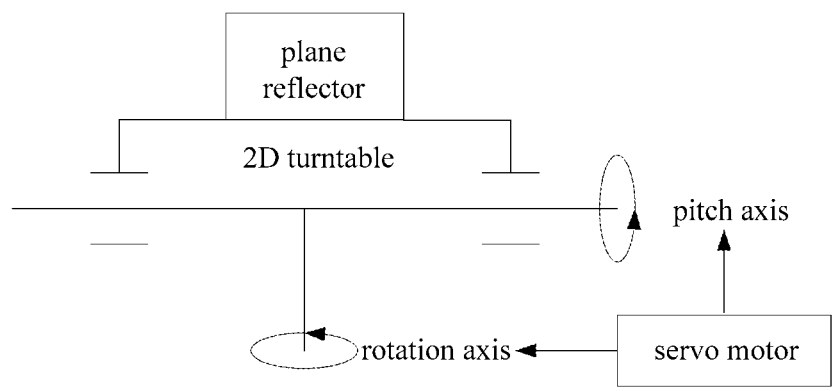
FIG. 3 is a schematic diagram of a scanning rotating mirror of the detecting device combining images with spectra in an ultra-wide waveband of the invention.

The signal processing unit is mainly operable for receiving images and spectra in long wave infrared waveband and images and spectra in visible and near-infrared waveband, processing and analyzing the images and spectra in real time, and controlling the scanning rotating mirror (as shown in FIG. 3) to track moving objects and dynamic behaviors.

While preferred embodiments of the invention have been described above, the invention is not limited to disclosure in the embodiments and the accompanying drawings. Any changes or modifications without departing from the spirit of the invention fall within the scope of the invention.

What is claimed is:

1. A detecting device combining images with spectra in an ultra-wide waveband, comprising a scanning rotating mirror, a Cassegrain mirror assembly, a first spectroscope, a reflector, a first broadband lens assembly, a second broadband lens assembly, a third broadband lens assembly, a fourth broadband lens assembly, a second spectroscope, a third spectroscope, a visible and near-infrared lens assembly, a long wave lens assembly, a CCD imaging unit, an FPA imaging unit, a Fourier spectrum measuring unit and a grating spectrum measuring unit, wherein said scanning rotating mirror is controlled by a servo motor to aim at a target area and operable for reflecting light from the target area to said Cassegrain mirror assembly, said Cassegrain mirror assembly is operable for collecting the reflected light and reflecting it to said first spectroscope, said first spectroscope is operable for transmitting infrared light of 2~14 um to said first broadband lens assembly and reflecting infrared light of 0.4~2 um to said reflector, said second spectroscope is operable for transmitting a portion of light of a first predetermined waveband to said long wave lens assembly and reflecting the residual portion of light of said first predetermined waveband and light of the residual waveband to said second broadband lens assembly simultaneously, and said long wave lens assembly is operable for focusing light transmitted by said second spectroscope to said FPA imaging unit for imaging;

said second broadband lens assembly is operable for focusing light reflected by said second spectroscope to said Fourier spectrum measuring unit for spectrum acquisition;

said reflector is operable for reflecting light of 0.4~2 um reflected by said first spectroscope to said third broadband lens assembly, said third spectroscope is operable for transmitting a portion of light of a second predetermined waveband to said visible and near-infrared lens assembly and reflecting the residual portion of light of said second predetermined waveband and light of the residual waveband to said fourth broadband lens assembly simultaneously, and said visible and near-infrared lens assembly is operable for focusing light transmitted by said third spectroscope to said CCD imaging unit for imaging; and said fourth broadband lens assembly is operable for focusing light reflected by said third spectroscope to said grating spectrum measuring unit for spectrum acquisition.

2. The detecting device of claim 1, wherein said first predetermined waveband is long wave infrared waveband and said second predetermined waveband is visible and near-infrared waveband.

3. The detecting device of claim 1, wherein said scanning rotating mirror comprises a plane reflector, a 2D turntable and a servo motor, said plane reflector is fixed on said 2D turntable by a groove therein, two drive shafts of said servo motor are mechanically connected to a pitch axis and a rotation axis of said 2D turntable respectively, and said plane reflector can pitch or rotate with said 2D turntable driven by said servo motor.

4. The detecting device of claim 3, wherein said plane reflector is gilded K9 glass with a comparatively high reflectivity for visible, near-infrared, short wave infrared, medium wave infrared and long wave infrared light.

5. The detecting device of claim 1, wherein said Cassegrain mirror assembly uses a Cassegrain system and is formed by a parabolic reflector and a hyperboloid reflector, so as to realize imaging in visible, near-infrared and long wave infrared wavebands and energy gathering of a target.

6. The detecting device of claim 5, wherein an occlusion ratio between said parabolic reflector and said hyperboloid reflector is no greater than 3:1.

7. The detecting device of claim 1, wherein said first spectroscope, said second spectroscope and said third spectroscope are plated with a two-layered antireflection film respectively, said first spectroscope reflects visible and near-infrared light totally and transmits short wave, medium wave and long wave infrared light totally, said second spectroscope transmits 50% of long wave infrared light to said long wave lens assembly to realize compensation and calibration of long wave infrared imaging and reflects the residual light to said second broadband lens assembly, and said third spectroscope transmits 50% of visible and near-infrared light to said visible and near-infrared lens assembly to realize compensation and calibration of visible and near-infrared imaging and reflects the residual light to said fourth broadband lens assembly.

8. The detecting device of claim 1, wherein said first broadband lens assembly and said second broadband lens assembly are operable for compensation and calibration of a converged spot of short wave, medium wave and long wave infrared light, said second broadband lens assembly can be coupled with a short wave, medium wave and long wave infrared fiber for output, said third broadband lens assembly and said fourth broadband lens assembly are operable for compensation and calibration of a converged spot of visible and near-infrared light, and said fourth broadband lens assembly can be coupled with a visible and near-infrared fiber for output.

9. The detecting device of claim 1, wherein said first broadband lens assembly, said second broadband lens assembly, said third broadband lens assembly and said fourth broadband lens assembly are produced by athermalisation so that locations of imaging surfaces thereof can keep stable at an ambient temperature of −40° C.~+60° C. without a focusing component.

10. A detecting method based on the detecting device combining images with spectra in an ultra-wide waveband of claim 1, comprising steps of:
(1) capturing and tracking moving objects and dynamic behaviors by a long wave infrared imaging unit thereby obtaining a long wave infrared image sequence thereof, and capturing and tracking the moving objects and the dynamic behaviors by a visible and near-infrared imaging unit simultaneously thereby obtaining a visible and near-infrared image sequence thereof;
(2) capturing target feature points (x1, y1) of long wave infrared imaging and target feature points (x2, y2) of visible and near-infrared imaging respectively by an object detecting module and outputting coordinates of the target feature points (x1, y1) and coordinates of the target feature points (x2, y2);
(3) outputting target feature points (x, y) of the moving objects and the dynamic behaviors by combining the target feature points (x1, y1) with the target feature points (x2, y2);
(4) moving optical axis of the long wave infrared imaging unit and that of the visible and near-infrared imaging unit respectively to each of the target feature points (x, y) by the scanning rotating mirror;
(5) obtaining ultra-wide waveband infrared spectra by the Fourier spectrum measuring unit and obtaining visible and near-infrared spectra by the grating spectrum measuring unit;
(6) combining images and spectra in visible, near-infrared and long wave infrared wavebands respectively and obtaining images and spectra of the moving objects and the dynamic behaviors in an ultra-wide waveband;
(7) outputting identification of the moving objects and the dynamic behaviors by a recognition module; and
(8) storing the images and the spectra of the moving objects and the dynamic behaviors in the ultra-wide waveband in a target fingerprint database and outputting detection results in real time by a screen.

* * * * *